Patented Aug. 29, 1933

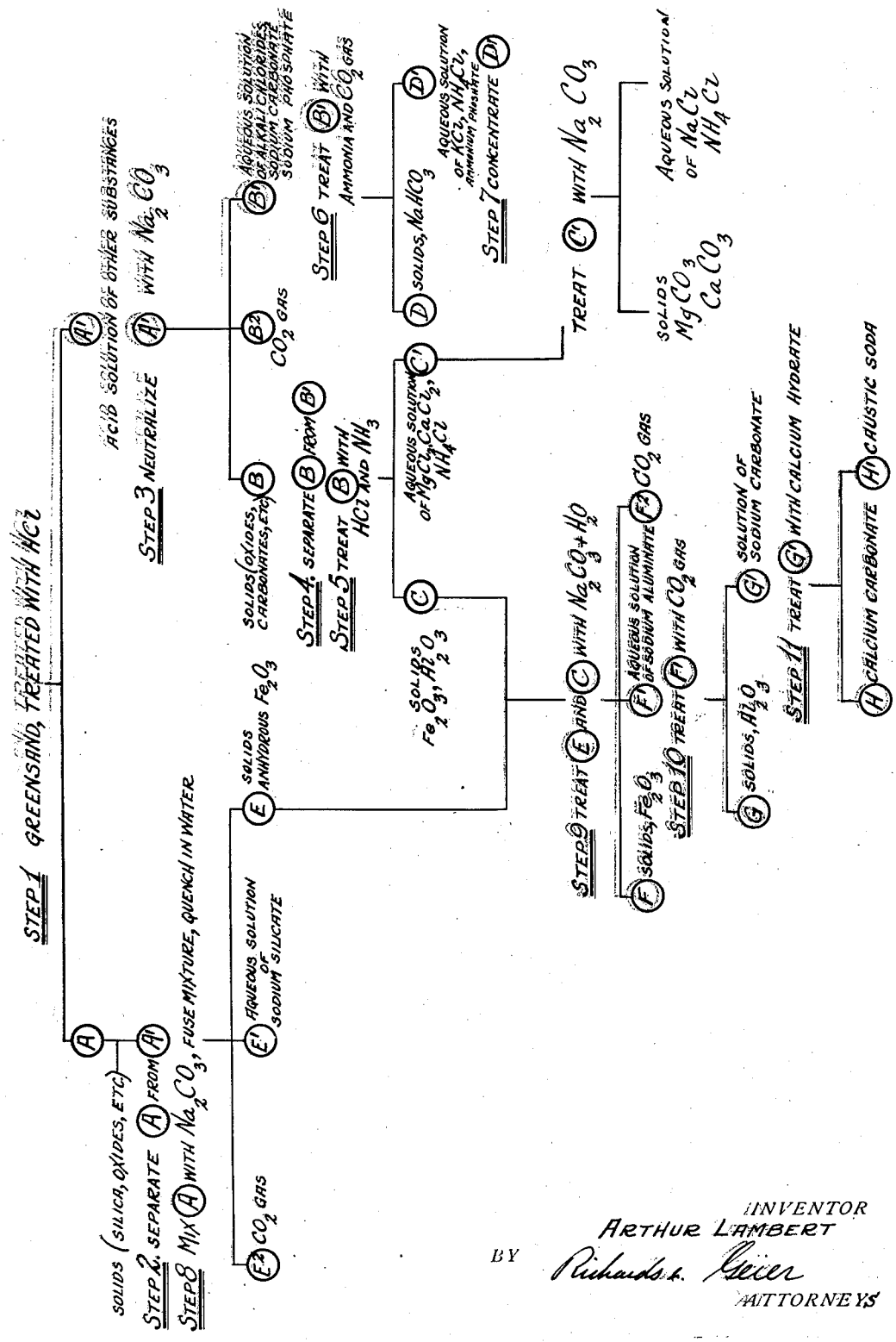

1,924,503

UNITED STATES PATENT OFFICE 1,924,503

TREATMENT OF COMPLEX SOLUTIONS OF SALTS

Arthur Lambert, New York, N. Y., assignor to Cosmic Arts, Inc., New York, N. Y., a corporation of Delaware Application February 9, 1928. Serial No. 253,042

1 Claim. (Cl. 23—65)

My present invention relates to the treatment of complex salt solutions containing a substantial amount of at least two salts, one of which must be a salt of an alkali metal (sodium, potassium), or of an alkaline earth metal (barium, calcium), or of magnesium or ammonium, while the other may be any salt different from the first. Complex salt solutions of this type (such as are found, for instance, in certain natural waters and in certain industrial liquids) are subjected to the action of ammonia (whether gaseous or liquid) and/or carbon dioxide either together or separately, or, as an equivalent, I may employ a treatment with ammonium bicarbonate. I may, therefore, in some cases employ carbon dioxide alone, and in others, ammonia alone. This states the general principle as to reagents employed. As to specific applications, it will be understood that even a single alkali metal salt in complex solution, that is to say, accompanied by one or more other marketable salts of any character will be within the scope of substances to be treated according to my invention. Among the most important examples of raw materials to be subjected to my improved process, I will mention cases where an alkali metal salt, and particularly potassium chloride or potassium sulfate is found, in a natural solution or in a liquor formed in the course of industrial operations, associated with other salts such as aluminum salts, iron salts, borax, phosphates, etc. The advantages of my process reside in an increased yield of valuable products. Certain features of the process set forth herein have been disclosed in my earlier applications filed in the United States Patent Office June 12th, 1924, Serial No. 719,508, November 28th, 1924, Serial No. 752,804, June 10th, 1927, Serial Number 198,007, and September 24th, 1925, Serial No. 58,298, and, as regards subject-matter common to the present and said earlier cases, my present application is to be considered a continuation in part of such earlier cases.

I desire it to be understood that whenever the liquor under treatment contains any sodium sulfate, filtration is to be carried out at a temperature of 33.3° C.

This improved process is applicable, among others, to the treatment of solutions obtained from various minerals or raw materials, such as greensand (which consists largely of a silicate of iron and potassium), alunite, leucite, feldspar, bauxite, etc.

As an example of my process, I will now describe the way in which said process was applied to the treatment of a specific New Jersey greensand (glauconite, a ferruginous alkaline aluminosilicate of greenish color) of the following composition: (its formula being $FeKSi_2O_6+aq$, in which some iron is replaced by aluminum and wherein magnesium is sometimes present).

| | |
|---|---:|
| Silica ($SiO_2$) | 50.32 |
| Ferric oxide ($Fe_2O_3$) | 18.38 |
| Ferrous oxide (FeO) | 3.02 |
| Alumina ($Al_2O_3$) | 7.53 |
| Lime (CaO) | 0.65 |
| Magnesia (MgO) | 3.82 |
| Sodium oxide ($Na_2O$) | 0.22 |
| Potassium oxide ($K_2O$) | 7.88 |
| Carbon dioxide gas ($CO_2$) | 0.15 |
| Phosphoric anhydride ($P_2O_5$) | 0.34 |
| Water | 8.58 |
| Total | 100.89 |

Of such greensand I took one kilogram, dry and screened, and over this I poured at ordinary room temperature a hydrochloric acid solution prepared by diluting 100 cubic centimeters of commercial hydrochloric acid having a strength of from 18° to 22° Bé., with a sufficient amount of water (about 4,000 cubic centimeters) to avoid all danger of the acid causing too sudden a gelification. Some heat is developed by the reaction during this digestion step, and when the mass had cooled off, I agitated it. From two to three hours were required for this digestion. While the reaction proceeds satisfactorily at various temperatures, I found that quicker and better results can be obtained at a temperature of 100° C. and I therefore prefer this. As a result of this step, if operating at about 100° C., all the constituents of the greensand are dissolved except the silica, but if operating at ordinary room temperature there was left undissolved, (in addition to the silica) a certain percentage of the oxides of iron and some phosphates. The silica which remains in either event, forms a sort of skeleton which is of great value on account of its adsorbent powers and moreover favors the formation of gelatinous silica and is well adapted for the manufacture of sodium silicate. As I have just stated, when operating at ordinary room temperatures, a small portion of the iron oxides is left undissolved, and for this reason I employ subsequently in such case, an additional amount of hydrochloric acid (see fifth step). Instead of hydrochloric acid, I might employ other mineral acids, for instance sulfuric or nitric acid.

The second step consisted of a filtration, by which the residue just specified (silica, oxides of iron) was separated from an acid yellow mother liquor containing hydrochloric acid and water and, dissolved therein, chlorides of iron, aluminum, potassium, magnesium and calcium, and phosphoric anhydride.

The third step consisted in neutralizing the mother liquor. This was effected by adding sodium carbonate, $Na_2CO_3$, in the proportion of one part of such carbonate, by weight, to twenty-five parts of mother liquor. This neutralizing treatment results in the evolution of carbon dioxide gas, which may be collected in any well-known or approved manner, and thus recovered for industrial or other uses. Furthermore, the neutralizing treatment produces precipitates of ferric oxide, $Fe_2O_3$, aluminum oxide $Al_2O_3$, magnesium carbonate, and calcium carbonate. Finally the neutralization also produces a liquid of about from 10° to 15° Bé., which is an aqueous solution of potassium chloride and sodium chloride, sodium phosphate ($Na_2HPO_4 + 12H_2O$), with traces of sodium carbonate. Instead of sodium carbonate, I might employ as the neutralizing agent for this third step, either ammonia, $NH_3$, or ammonium bicarbonate, or as its equivalent ammonia and carbon dioxide, or the filter liquid of the Solvay process, or a base of the alkaline earth metals (for instance, lime magnesia). This modification, however, is not so desirable because I thereby forego the advantage of producing sodium carbonate as referred to hereinafter, and also lessen the production of ammoniacal salts, and lose the advantage of utilizing waste heat produced during the calcining of soda and caustic soda which will always be carried out in the same plant or works, as a natural consequence of applying my treatment to greensand which has been selected as an example. I might, of course, have chosen other raw materials as examples, for instances, feldspar, silicates, or aluminates.

The fourth step consisted in separating the above mentioned precipitate or solid portion from the solution or liquid, as by decanting, filtration, etc. This solution is then brought to a density of 28° Bé. by concentration (evaporation), or by adding sodium chloride or adding sodium chloride with a slight proportion of a potassium salt (sulfate, carbonate, chloride).

The fifth step consisted in treating the said precipitate to separate the different compounds, especially the aluminum from the iron and both from the alkali earth metal salts. For this purpose, the precipitate was mixed with water, and then I added hydrochloric acid (of a strength of from 18° to 22° Bé.) in the proportion of one part of acid (by weight) to forty parts of water. Thereupon, I added an aqueous solution of ammonia, in an amount about 10% by volume of the combined volume of hydrochloric acid and water, that is to say, until a precipitate was obtained. This precipitate consisted of ferric oxide and aluminum oxide (the hydrates, $Fe_2O_3$ and $Al_2O_3$), while the liquid contained in aqueous solution, the chlorides of magnesium, calcium, and ammonium. If desired, this aqueous solution may be treated with sodium carbonate, to precipitate carbonates of magnesium and of calcium. The ammonium chloride formed remains in solution in the liquid which impregnates the oxides. The latter are washed repeatedly with cold water or at ordinary room temperature in order to avoid decomposing the ammonium carbonate, which thus remains in solution.

Since the treatment, when performed with heating, produces a large amount of iron oxide, which it is desirable to separate from the alumina, in order to utilize them individually in metallurgical and dyeing processes respectively, this precipitate of alumina and iron oxide might be treated with sulfuric acid. The resulting sulfates can be separated from each other readily by crystallization. The iron sulfate thus separated could be utilized as such, or converted into an oxide by well-known treatments. The aluminum sulfate could be used as a substitute for alum in dyeing processes, in accordance with the present trend of the dyeing industry.

The sixth step consisted in treating the filtered 28° Bé. solution of potassium chloride and sodium chloride etc. obtained by the third and fourth steps, (which solution I term a solution of artificial sylvinite) with gaseous ammonia and then bubbling carbon dioxide through the liquid. A portion of the potassium chloride, not being attacked, remains in solution, the remainder of the potassium chloride is converted into potassium bicarbonate, which is very readily soluble and remains in solution; a solution of ammonium chloride, and a precipitate of sodium bicarbonate are also formed, according to the following equation:

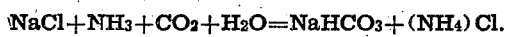
$$NaCl + NH_3 + CO_2 + H_2O = NaHCO_3 + (NH_4)Cl.$$

There is also produced some ammonium phosphate in solution, some ammonium bicarbonate, some potassium carbonate and some free ammonia remains.

The potassium chloride and the ammonium chloride are not combined with each other, but form a mixture or complex solution, and can be separated from each other by fractional crystallization. Should it be desired to use the potassium chloride as the alkali for producing a silicate, such chloride should first be converted into potassium carbonate by adding sodium carbonate. The sodium bicarbonate, $NaHCO_3$, can be reconverted into the carbonate, $Na_2CO_3$, in any well-known or approved manner, to be used in the third or neutralization step, or in the production of any sodium salt according to standard methods. The ammonia also could be recovered for use in the process (fifth step). Instead of ammonia and carbon dioxide, I may employ bicarbonate of ammonia as an equivalent.

In order to avoid loss of ammonia during the subsequent steps, whether crystallization, or separation of the potassium salts, the entire mass should be converted into fixed salts before evaporating the liquids, such conversion being obtained by adding a mineral acid selected according to the result desired. In the present case, for instance, hydrochloric acid would be used.

If the purpose is simply to recover free ammonia, the liquid is heated to boiling temperature and passed through an apparatus known in the industry as a heater or reheater. In such apparatus the free ammonia and also that of ammonium bicarbonate are recovered readily.

The simplest procedure consists in converting the entire mass into a phosphated ammonia-potash fertilizer. If the amount of phosphoric anhydride contained in the greensand is greater than the 0.34% indicated at the beginning of this specification, the fertilizer will be all the better.

Treatment of the residuary liquid with lime would be useless or inadvisable, and would really constitute a step backward, bringing the treatment into the category of methods (like the Solvay process) which deal with single salts, whereas my method relates to the treatment of complex salts of the type referred to above.

It is also unsuitable to treat such liquids by the old crystallization process used at Stassfurt, Germany. The liquid obtained by the sixth step of my process is of very much the same character as a solution of natural sylvinite, and may be utilized, in conjunction with sodium nitrate or with caliche, for the production of potassium nitrate. The residual liquid or solution yields sodium chloride as a precipitate, said precipitate being impregnated with potassium nitrate, which is removed by washing with hot water. But this residual chloride which is again dissolved in the wash water until the density of the liquid is about 24° or 25° Bé., constitutes a residual liquid. By treating such liquid simultaneously with carbon dioxide and ammonia, I obtain soda and ammoniacal salts, instead of sodium chloride alone, and thus the cost of production is lowered.

My improved process may also be applied to the treatment of other substances not previously treated in this manner. Thus it is novel to apply the treatment set forth herein, to a solution of alunite containing potassium sulfate. Another novel application relates to the treatment of a polyphalite solution. In these cases, sodium sulfate and potassium nitrate are obtained. Evaporation will cause such sodium sulfate to be deposited; it is then washed, just as was the sodium chloride in the example given above, the wash water, in which a portion of the sodium sulfate has been redissolved, is treated with carbon dioxide and ammonia, as above, or the wash water may be added to the other liquids containing sodium chloride, the ammonia treatment being then applied to the combined liquids. In all these examples, the treatment is applied to complex salt solutions.

The seventh step consisted in concentrating the aqueous complex solution of potassium chloride and ammonium chloride obtained by the sixth step (after filtration or other separation from the precipitate). Such concentration could be effected in various ways, for instance, (1) by evaporation in a Kestner or Swanson apparatus; (2) by the sole addition of common salt, NaCl; (3) by adding a solution containing both sodium chloride and potassium chloride. If this concentration of the filtered solution be carried to the point where the density of the liquid is 28° Bé., such liquid becomes in effect a solution of artificial "sylvinite", one of the highest grades of potash used as a fertilizer; and if the manufacture of a fertilizer is the sole or the chief object of the process, the concentration of the liquid should be effected by means of a compound, either natural or artificial, which will increase the potash content of the product. The fertilizer will also contain neutral ammonium phosphate, $(NH_4)_3PO_4 + 3H_2O$. When the liquid has been concentrated to 28° Bé., it may be treated with carbon dioxide and ammonia simultaneously, or with ammonium bicarbonate, or with the filtered liquid of the ammonia (Solvay) process, or with similar liquid. I would thus obtain, after filtration, sodium acid carbonate, ammonium chloride and potasium salts, forming together a fertilizer.

In some cases, and especially when making fertilizers, this seventh step may take the place of the sixth step, the latter being omitted, and the concentration treatment described as the seventh step being applied directly to the filtered solution of potassium chloride and sodium chloride, etc., obtained by the third and fourth steps. Both steps, the sixth and seventh, in the succession named, will be employed together if it is desired to use the filtered liquid for purposes other than in the direct manufacture of a potash ingredient for fertilizers.

The following treatment was applied to the solids or residue obtained by the first and second steps.

Such solids (insoluble in water or in acids) were mixed with sodium carbonate ($Na_2CO_3$) using an amount of this salt equal to from 25 to 30 percent (by weight) of said solids or residue. I may add that a considerably smaller proportion of sodium carbonate would be sufficient in commercial practice. The mixture was fused or melted at a temperature of 1800° C., and then the molten mass was chilled or quenched by plunging it into cold water. If the first step was carried out at ordinary room temperature, this fusion and chilling treatment, which may be considered as the eighth step of the process, produced carbon dioxide gas, an aqueous solution of sodium silicate, and solids (a precipitate or residuum) consisting of anhydrous oxide of iron ($Fe_2O_3$) and of a small amount of free silica, the reaction being substantially represented by the equation:

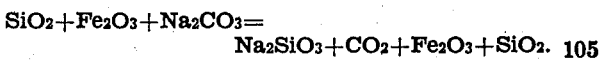

$$SiO_2 + Fe_2O_3 + Na_2CO_3 = Na_2SiO_3 + CO_2 + Fe_2O_3 + SiO_2.$$

While the solid residuum of the first step was insoluble in acids, the iron oxide forming part of the solid residuum of the eighth step is soluble in acids. The free silica found in this latter residuum is accompanied by a silica compound which I term "amorphous sodio-ferric silicate", having probably the constitution:

$$Fe_2O_3, 3SiO_2 xNaO.$$

The products of the eighth step are therefore: (1) a gas, carbon dioxide ($CO_2$) which may be collected and used for any purpose, for instance for the treatment of the chloride solution in the sixth step of this process; (2) an aqueous solution of water glass (sodium silicate, $Na_2SiO_3$), and (3) a solid residuum, which when the first step has been conducted at ordinary room temperature, consists of silica, amorphous sodio-ferric silicate, and anhydrous oxide of iron ($Fe_2O_3$). If, however, the first step was conducted at a temperature of about 100° C., the solid residuum of the eighth step will be exclusively silica. The heat absorbed by the water used for chilling during this step, may be utilized in any suitable way.

The ninth step consisted in treating the solid residuum or precipitate (oxides of iron and aluminum) resulting from the fifth step for the purpose of separating the ferric oxide from the aluminum oxide. This separation was effected as follows: I added sodium carbonate, $Na_2CO_3$, in the proportion of about 1 part (by weight) of such carbonate to 25 parts of the solution. After further boiling, filtration was applied to separate the liquid from the solids. This treatment resulted in the production of (1) gaseous carbon dioxide, $CO_2$; (2) an aqueous solution of sodium aluminate ($Al_2O_3, 3Na_2O$), and (3) a precipitate of ferric oxide, $Fe_2O_3$. This reacttion may be represented by the following equation:

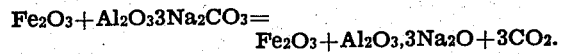

$$Fe_2O_3 + Al_2O_3 3Na_2CO_3 = Fe_2O_3 + Al_2O_3, 3Na_2O + 3CO_2.$$

The residue of the eighth step (anhydrous ferric oxide) was treated in the same way, in fact, this residue and that of the fifth step might be treated together. I might, however, treat the residue of the eighth step with ammonia, NH₃, instead of subjecting it to the treatment just described as the ninth step. The result would be substantially the same.

The tenth step consisted in bubbling carbon dioxide gas, CO₂, through the sodium aluminate solution resulting from the ninth step after such solution had been separated by filtration. This caused a precipitation of alumina (Al₂O₃), in accordance with the following equation:

$$Al_2O_3, 3Na_2O + 3CO_2 = Al_2O_3 + 3Na_2CO_3.$$

The products of this reaction are sodium carbonate (Na₂CO₃) in aqueous solution, and a precipitate consisting of aluminum hydrate, Al₂O₃+aq. The solution can be separated from the precipitate in the usual ways, for instance by filtration. The solution may be evaporated for producing sodium carbonate crystals, or may be added to the artificial sylvinite solution mentioned in connection with the sixth step.

The eleventh step consisted in the recovery of sodium carbonate, or its transformation into caustic soda, NaOH, in accordance with the following equation:

$$Na_2CO_3 + CaO + H_2O = 2NaOH + CaCO_3.$$

The calcium carbonate, CaCO₃, may be used cyclically in the operation for the purpose of causticizing the sodium carbonate, after transformation into calcium oxide, CaO.

The accompanying drawing is a diagram or "flow sheet" illustrating the example set forth above.

Instead of neutralizing with sodium carbonate, as described in the third step, I may neutralize with carbon dioxide and ammonia, whereby ammonium bicarbonate is formed, together with a precipitation of hydrates of iron and aluminum. The liquid separated by filtration would contain potash and ammoniacal salts, and after crystallization would yield a very efficient ammoniacal potash fertilizer. The neutralization may also be effected with ammonia, but the results are not so good in that case, since no soda is produced, and the production of ammoniacal salts is reduced, and moreover, there is no utilization of the waste heat derived from the calcination of soda or caustic soda.

Another manner of treating the filtered liquid resulting from the first and second steps, consists in mixing such liquid with caliche (impure sodium nitrate) or with commercial sodium nitrate; the result will be the formation, by a double decomposition, of a solution of potassium nitrate and sodium chloride. By subsequent concentration sodium chloride is precipitated, while potassium nitrate remains in solution; this compound is then obtained in solid form by evaporating the solution and effecting crystallization. The sodium chloride (a residual product) is dissolved in water until the solution has a density of about 24 or 25° Bé., thus forming a residual liquid which is attacked simultaneously with carbon dioxide and ammonia for the ultimate production of the sodium carbonate used in the operation.

The examples given above relate to the treatment of greensand or of solutions obtained therefrom. As has been indicated at the beginning of this specification, the invention is not restricted to treatment of greensand or of solutions of the type just referred to. For instance, I may treat a neutral solution of alunite with carbon dioxide and ammonia, thereby precipitating alumina and a small amount of iron. Such treatment would result in the production of ammonium sulfate and potassium sulfate, forming (after crystallization) an ammoniacal potash fertilizer. I may also carry out the treatment with ammonia alone.

Again, leucite, feldspar, bauxite and other minerals might be treated in the same manner as above described by me in connection with greensand.

As an alternative treatment, particularly in the case of alunite or polyhalite, I may treat the aqueous solution resulting from the third and the fourth steps described above, with sodium nitrate (NaNO₃), to produce potassium nitrate (KNO₃).

The general principle of my process involves the direct use of carbon dioxide or ammonia or preferably both of them (either separately or together) or, as an equivalent, ammonium bicarbonate, as an agent or agents, to act on a solution of neutral or acid complex salts, in the form of compounds or mixtures, as obtained in nature or in the course of industrial processes, said solution containing at least one salt of an alkali metal (sodium or potassium,) or a salt of an alkali earth metal (calcium, barium) or of magnesium or an ammoniacal salt. Thus a single alkali metal salt in complex solution, that is accompanied for instance by several different marketable salts of any kind, will be adapted for treatment according to the general principles enunciated, the applications of which are manifold.

The example given above, as regards the treatment of greensand, will give sufficient indications to enable a man skilled in the art to apply the said general principles to the treatment of other materials, such as, for instance, leucite, alunite, polyhalite, feldspar, aluminous silicates, and natural waters containing sodium or potassium, also containing borates and even salts of the halogens (bromine, iodine, fluorine).

Thus, in the case of an acid solution obtained from greensand, I proceed as follows:

(a) First, leaching with a mineral acid; the residual liquid is treated with carbon dioxide and/or ammonia, either separately or together, that is, I may treat them with ammonia or ammonium bicarbonate.

(b) Instead of this, this first residual liquid may be treated with sodium carbonate, sodium bicarbonate, potassium carbonate or bicarbonate, ammonium bicarbonate, or calcium carbonate, barium carbonate, or magnesium carbonate, and the resulting liquid (which is a second residual liquid, very similar to a solution of natural sylvinite) may be treated with carbon dioxide and/or ammonia, either separately or together.

(c) Or the second residual liquid may be mixed with caliche or sodium nitrate to produce potassium nitrate, and the third residual liquid, containing a solution of sodium chloride only, is treated with carbon dioxide and/or ammonia.

(d) Instead of potassium chloride, as in the case of greensand, the raw material may contain potassium sulfate, as in the case of alunite, $$K_2SO_4 + Al_2(SO_4)_3 + Al_2(OH)_6,$$

or of polyhalite, $$K_2SO_4(MgSO_4)2CaSO_4.2H_2O.$$

If the solution obtained according to my process either from alunite or from polyhalite is mixed with caliche or with commercial sodium nitrate, the residual liquid will contain sodium sulfate and will be treated simultaneously with carbon dioxide and ammonia.

(e) In the case of polyhalite, the solution obtained from this mineral may be treated directly with ammonium bicarbonate or better with sodium carbonate, and thereupon with carbon dioxide and/or ammonia. After separating the solution, calcium sulfate will be found in the filter, that is, such calcium sulfate will form part of the product indicated at A in the drawing.

Various modifications may be made without departing from the nature of my invention as set forth in the appended claim.

I claim:

The process which consists in preparing a mineral acid solution containing a substantial amount of at least two salts, one of which is a salt of an alkali metal (sodium or potassium), adding an excess of sodium carbonate to produce a precipitate and an aqueous solution, and treating said solution with aqueous amonia and gaseous carbon dioxide.

ARTHUR LAMBERT.